FLUORINE CONTAINING COMPOSITION

Gustav A. Schmidt, Schenectady, N.Y., assignor to General Electric Company, a corporation of New York
No Drawing. Filed Aug. 17, 1959, Ser. No. 833,918
11 Claims. (Cl. 260—448.2)

This invention relates to certain fluoroalkoxyalkyl silanes and siloxanes, and to the use of these compositions as agents for the treatment of cellulosic fabrics to increase the water repellency and oil resistance thereof, and also to the use of these materials as lubricants and lubricity additives.

Heretofore, organopolysiloxanes have been used extensively in the treatment of cellulosic materials to render these materials water repellent and have been used as lubricants and lubricant additives. While these prior art materials have done an outstanding job for their intended use, they have still been somewhat deficient in their total effectiveness. Thus, while prior art organopolysiloxanes have done a remarkable job in rendering fabrics less resistant to moisture, they have not had as high a spray rating as desired, and they have not rendered the fabric soil-repellent. When using organopolysiloxanes as lubricants, it is found that while the viscosity of the silicone materials remains fairly constant with changes in temperature, and while the silicones are satisfactory for low pressure lubricating application, they begin to fail when high pressures are exerted between the surfaces being lubricated.

I have now discovered a new class of silanes and polysiloxanes which have improved properties over prior art materials, particularly with regard to their ability to waterproof cellulosic materials and render them soil-resistant and with regard to their ability to lubricate moving surfaces under extreme conditions.

The new silanes within the scope of the present invention contain one silicon-bonded carbfluoroalkoxyalkyl radical, and up to one silicon-bonded monovalent hydrocarbon radical, with the remaining valences of silicon being satisfied by fluoroalkoxy radicals, the fluoroalkoxy groups being selected from the class consisting of 1,1-dihydroperfluoroalkoxy radicals and alpha,alpha,omega-trihydroperfluoroalkoxy radicals. Within the scope of the silanes of the present invention are those having the formula:

(1) $[XF_2C(CF_2)_mCH_2OOC(CH_2)_n][R]_aSi[OCH_2(CF_2)_mCF_2X]_b$ where R is a monovalent hydrocarbon radical, X is a member selected from the class consisting of hydrogen and fluorine, $m$ is an integer equal to at least 2, e.g., from 2 to 16 or more, $n$ is an integer equal to at least 2, e.g., from 2 to 6 or more, $a$ is 0 or 1, $b$ is 2 or 3, and the sum of $a+b$ is equal to 3.

Organopolysiloxanes within the scope of the present invention are those in which the silicon-bonded organo groups include at least one carbfluoroalkoxyalkyl group, with any remaining organo groups being selected from the class consisting of silicon-bonded perfluoroalkoxy groups and silicon-bonded monovalent hydrocarbon radicals, and mixtures thereof. In the preferred embodiment of my invention, the organopolysiloxanes contain at least one silicon-bonded carbfluoroalkoxyalkyl radical with any remaining organo groups being monovalent hydrocarbon groups. The organopolysiloxanes within the scope of the present invention include those having the formula:

(2)
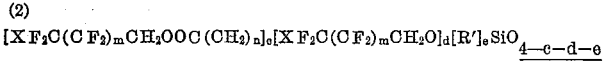

where X is a member selected from the class consisting of hydrogen and fluorine, R' is a monovalent hydrocarbon radical, $m$ and $n$ are as previously defined, $c$ has a value of from 0.05 to 1.0 and preferably from 0.1 to 1.0, $d$ has a value not more than $c$ and is equal to from 0 to 1.0, $e$ has a value of from 0 to 2.33, and the sum of $c+d+e$ is equal to from 1.0 to 2.67. In the above definition, the perfluoroalkoxy group is selected from the class consisting of 1,1-dihydroperfluoroalkoxy group, and alpha,-alpha,omega-trihydroperfluoroalkoxy group.

Among the various monovalent hydrocarbon radicals employed for R in the above formula, it is preferred that R be a monovalent hydrocarbon radical free of aliphatic unsaturation. Specific radicals represented by R include, for example, alkyl radicals, e.g., methyl, ethyl, propyl, butyl, isobutyl, octyl, etc. radicals; aryl radicals, phenyl, naphthyl, tolyl, xylyl, ethyl phenyl, etc. radicals; aralkyl radicals, e.g., benzyl, phenyl ethyl, etc. radicals; cycloalkyl radicals, e.g., cyclohexyl, cycloheptyl, etc. radicals; chlorinated aryl radicals, e.g., chlorophenyl, dibromophenyl, chloronaphthyl, etc. radicals; as well as other radicals containing substituents which are inert under the conditions of the reactions employed to prepare the products of the present invention. R' represents all of the radicals previously described for R and, in addition, represents monovalent hydrocarbon radicals containing olefinic and aliphatic unsaturation, such as, for example, vinyl, allyl, cyclohexenyl, etc. radicals.

A number of methods are suitable for the preparation of the silanes within the scope of Formula 1, and the organopolysiloxanes within the scope of Formula 2. In all cases, the product is formed by reacting an alcohol selected from the class consisting of 1,1-dihydroperfluoro alcohols and alpha,alpha,omega-trihydroperfluoro alcohols, with an organopolysiloxane or a silane containing a silicon-bonded omega-carboxyalkyl radical, the acid chloride of these carboxy alkyl radicals, or an omega-cyanoalkyl radical.

The 1,1-dihydroperfluoro alcohol and the alpha,alpha,-omega-trihydroperfluoro alcohol (both of which will be referred to hereinafter for sake of brevity as the perfluoroalkyl alcohol and containing the perfluoroalkyl radical) are well known in the art and are described by the following formula:

(3) $$XF_2C(CF_2)_mCH_2OH$$

where X and $m$ are as previously defined. Perfluoroalkyl alcohols within the scope of Formula 3 where X is fluorine are described in Patent 2,862,977—Schreyer. Perfluoro alcohols within the scope of Formula 3 in which X is hydrogen are described in Patent 2,739,077—Goebel. Among the many perfluoro alcohols which may be employed in the practice of the present invention can be mentioned, for example, 1,1,7-trihydroperfluoroheptanol, 1,1,11-trihydroperfluoroundecanol, 1,1,5-trihydroperfluoropentanol, 1,1-dihydroperfluorooctanol, 1,1-dihydroperfluorobutanol, 1,1-dihydroperfluoropropanol, 1,1-dihydroperfluoropentanol, 1,1-dihydroperfluoroheptanol, 1,1-dihydroperfluorononanol, 1,1-dihydroperfluoropentadecanol, etc.

One suitable method for forming the silanes within the scope of Formula 1 is by reacting a perfluoro alcohol within the scope of Formula 3 with an omega-cyanoalkyl-chlorosilane having the formula:

(4) $$[CN(CH_2)_n](R)_aSi(Cl)_b$$

where R, $n$, $a$ and $b$ are as previously defined.

Illustrative compositions within the scope of Formula 4 are beta-cyanoethyltrichlorosilane, beta-cyanoethylmethyldichlorosilane, gamma - cyanopropylmethyldichlorosilane, beta-cyanoethylphenyldichlorosilane, beta-cyanoethylpropyldichlorosilane, omega,cyanobutyltrichlorosilane, omega-cyanoheptylphenyldichlorosilane, etc. Methods of preparing the cyanoalkylchlorosilane within the scope of Formula 4 are shown in the art, e.g., in Patent 2,860,153—Saam, and Patent 2,837,551—Jex et al. Additional methods of preparing these cyanoalkylchlorosilanes are described in the application of Ben A. Bluestein, Serial No. 783,102, filed December 29, 1958, now U.S. Patent No. 2,971,970, and the application of Maurice Prober, Serial No. 401,702, filed December 31, 1953, and the application of Glen D. Cooper and Maurice Prober, Serial No. 529,896, filed August 22, 1955, all of the aforementioned applications being assigned to the same assignee as the present invention.

One method for forming these omega-cyanoalkylchlorosilanes is by reacting a suitable silane containing a silicon-bonded hydrogen atom with an olefinic nitrile. Thus, beta-cyanoethyltrichlorosilane is formed by refluxing a mixture of equimolar amounts of trichlorosilane and acrylonitrile for 24 hours in the presence of 5% by weight, based on the total weight of the reaction mixture of tributylamine. At the end of this time, the beta-cyanoethyltrichlorosilane is recovered by fractional distillation. Beta-cyanoethyltrichlorosilane can be converted to beta-cyanoethylmethyldichlorosilane by a conventional Grignard reaction. Thus, for example, one mol of beta-cyanoethyltrichlorosilane is added to 1 mol of methyl magnesium bromide in diethyl ether, and the mixture is refluxed for 24 hours. Solids are filtered from the reaction mixture and the beta-cyanoethylmethyldichlorosilane is recovered from the reaction mixture by fractional distillation. Other omega-cyanoalkylchlorosilanes within the scope of Formula 4 can be prepared by procedure analogous to that just described for the beta-cyanoethylchlorosilanes. Thus, if 1-cyanoheptene-5 is substituted for the acrylonitrile above in the reaction with trichlorosilane, using the same molar proportions of ingredients and the reaction conditions, the resulting product is the omega-cyanohexyltrichlorosilane. Employing phenyl magnesium bromide as a Grignard reagent, the aforementioned compound can then be converted to omega-cyanohexylphenyldichlorosilane.

In effecting the reaction between the perfluoro alcohol of Formula 3 and the omega-cyanoalkylchlorosilane of Formula 4 to form the desired silanes within the scope of Formula 1, a variety of reaction conditions may be employed. The simplest method of effecting this reaction is to simply add the perfluoro alcohol within the scope of Formula 3 to the cyanoalkylsilane within the scope of Formula 4 and heat the reaction mixture at elevated temperature, until reaction is effected. At this time, water can be added to the reaction mixture to provide two separate layers, one of which is the silane within the scope of Formula 1 and the other is an aqueous layer containing unreacted starting materials. The ratio of the perfluoro alcohol within the scope of Formula 3 and the cyanoalkylchlorosilane within the scope of Formula 4 may vary within extremely wide limits. However, since the net result of the reaction is to replace the nitrile group with the perfluoroalkoxy radical and to replace each of the silicon-bonded chlorine atoms with a perfluoroalkoxy radical, we prefer to add a number of mols of the perfluoro alcohol which corresponds to the total number of silicon-bonded chlorine atoms and the nitrile group of the cyanoalkylsilane of Formula 4. Excesses of either reactant may be employed but no particular advantage is derived therefrom. No particular catalyst is required for the reaction, and the reaction mixture is merely heated for a suitable time, such as for 8 to 24 hours at an elevated temperature, such as a temperature of from 50 to 150° C. to effect reaction. The amount of water added to the reaction mixture is not critical, but for convenience it is preferred that a volumetric excess of water be added. The silane within the scope of Formula 1 is recovered from the reaction mixture by decantation of the aqueous layer from the silane layer.

The preferred method for preparing the silanes within the scope of Formula 1 is by reacting the perfluoro alcohol within the scope of Formula 3 with a chlorocarbalkylsilane within the scope of Formula 5.

(5) 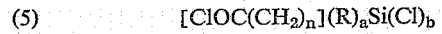

In Formula 5, $a$, $b$, $n$, and R are as previously defined. These chlorocarbalkylsilanes within the scope of Formula 5 are prepared by reacting a silicon hydride having the formula:

(6) 

with an acid chloride having terminal vinyl unsaturation within the formula:

(7) 

In effecting reaction between the silicon hydride of Formula 6 and the chlorocarbalkyl unsaturated acid chloride within the scope of Formula 7, the two reactants are merely added together and heated at the reflux temperature of the reaction mixture for a time which varies from several hours up to 24 hours or more, during which time the two reactants combine to form the chlorocarboxyalkylsilane within the scope of Formula 5. Among the many silicon hydrides within the scope of Formula 6 which can be employed in the practice of the present invention may be mentioned, for example, trichlorosilane, methyldichlorosilane, phenyldichlorosilane, octyldichlorosilane, naphthyldichlorosilane, chlorophenyldichlorosilane, etc. Among the various unsaturated acid chlorides which can be employed in the practice of the present invention may be mentioned, for example, acrylic chloride, methacrylic chloride, vinylacetyl chloride, allylacetyl chloride, etc. Since equimolar amounts of silicon hydride within the scope of Formula 6 and of the unsaturated acid chloride within the scope of Formula 7 are employed to produce the chlorocarbalkylsilane of Formula 5, in the preferred embodiment of my invention, I prefer to employ equimolar amounts of the two reactants. However, the use of excesses, such as a tenfold excess of either reactant is not precluded, although no particular benefit is derived therefrom. A number of suitable catalysts are available for promoting the reaction. Among these may be mentioned platinum on carbon, chloroplatinic acid, complexes of trialkyl amines with chloroplatinic acid, palladium chloride, etc. While the most efficient method of effecting the reaction is to heat the reaction mixtures at its reflux temperature which varies from about 50 to 100° C., during the course of the reaction, it should be understood that the reaction can also be effected at temperatures below the reflux temperature and at temperatures above the normal reflux temperature when super-pressures are employed. Although no particular advantage is derived from using reaction pressures other than atmospheric, the reaction can be effected at pressures of the order of .1 to 10 atmospheres. The desired chlorocarbalkylsilane within the scope of Formula 5 is isolated from the reaction mixture by fractional distillation.

Among the many chlorocarbalkylsilanes within the scope of Formula 5 which can be employed in the practice of the present invention may be mentioned, for example, chlorocarbethyltrichlorosilane, chlorocarbethylmethyldichlorosilane, chlorocarbpropyltrichlorosilane, chlorocarbpropylmethyldichlorosilane, chlorocarbethylphenyldichlorosilane, chlorocarbethylnaphthyldichlorosilane, chlorocarbutylmethyldichlorosilane, chlorocarbhexylmethyldichlorosilane, etc.

The reaction between the perfluoro alcohol within the scope of Formula 3 and the chlorocarbalkylsilane within the scope of Formula 5 can be effected by merely mixing the two reactants and heating the reaction mixture at an elevated temperature for from 1 to 24 or more hours. Since the reaction involves equimolar amounts of each of the reactants, in the preferred embodiment of my invention equimolar amounts are employed. However, no particular disadvantage is encountered when using excesses such as a tenfold exceed of either reactant. The temperature at which the reaction is effected can vary within wide limits and generally reaction temperatures of the order of 30 to 100° C. are employed, depending on the particular reactants employed and on the reaction temperature. The reaction is effected without the use of any catalyst, although conventional esterification catalysts may be employed if desired. The net effect of the reaction between the perfluoro alcohol of Formula 3 and the carbalkylchlorosilane within the scope of Formula 5 is to replace both the silicon-bonded chlorine atoms and the acid chloride chlorine atom with perfluoroalkoxy radicals to form the composition within the scope of Formula 1. Accordingly, in the preferred embodiment of my invention, sufficient amounts of the perfluoro alcohol within the scope of Formula 3 are employed to provide one mol of alcohol per mol of silicon-bonded chlorine and acyl chloride chlorine in the chlorocarbalkylsilane. Thus, when reaction is effected between a perfluoro alcohol within the scope of Formula 3 and chlorocarbethyltrichlorosilane, I employ 4 mols of the alcohol per mol of the chlorocarbethyltrichlorosilane. While no advantage is derived from using the perfluoro alcohol and the chlorocarbalkylsilane in ratios other than that described above, excesses of the perfluoroalkyl alcohol can be employed. In general, not more than about a tenfold excess is employed. Furthermore, the chlorocarbalkylsilane within the scope of Formula 5 can also be employed in excess. However, if an excess of either reactant is employed, it is preferred that it be an excess of the perfluoro alcohol. Where an excess of the chlorocarboxyalkylsilane is employed, it is preferred that the excess be not more than about a 20% excess.

After effecting reaction between the perfluoro alcohol of Formula 3 and the chlorocarbalkylsilane of Formula 5, the resulting silane of Formula 1 is isolated from the reaction mixture by fractional distillation.

The organopolysiloxane within the scope of Formula 2 containing the silicon-bonded carbperfluoroalkoxyalkyl radicals can be prepared by a number of different procedures. The simplest method of preparing these materials is by the hydrolysis of the monomeric carbperfluoroalkoxyalkylsilane within the scope of Formula 1. This is accomplished by mixing the silane within the scope of Formula 1 with water and an acid catalyst. The preferred acid catalyst for this purpose is concentrated sulfuric acid and, for example, hydrolysis of a silane within the scope of Formula 1 can be accomplished by mixing the silane slowly into an aqueous sulfuric acid solution. The concentration of the sulfuric acid solution employed for this purpose is not critical, satisfactory results being obtained with sulfuric acid solutions of 1 to 10% sulfuric acid concentration. The amount of acid is also not critical, but for convenience we employ a volumetric excess of the acid, such as a tenfold volumetric excess to facilitate the reaction. The hydrolysis and condensation reaction of the silane of Formula 1 results in siloxanes of varying degree of condensation, depending on the time of reaction and on the acid concentration. By controlling the time and acid concentration, it is possible to control the degree of condensation, i.e., the number of silicon-bonded perfluoroalkoxy radicals remaining in the polymeric material. Generally, complete reaction is accomplished in a time of about 3 to 24 or more hours to form a substantially completely condensed organopolysiloxane. When shorter times than this are employed in the hydrolysis and condensation, it is apparent that incomplete condensation takes place, so that both siloxane linkages and siliconbonded perfluoroalkoxy radicals are present in the polymeric material. It is also apparent that the nature of the siloxane within the scope of Formula 2 is controlled by the nature of the silane of Formula 1. Thus, when the silane within the scope of Formula 1 contains three siliconbonded perfluoroalkoxy radicals, the resulting completely condensed siloxane consists essentially of carbperfluoroalkoxyalkylsiloxane units. When the silane within the scope of Formula 1 contains a silicon-bonded monovalent hydrocarbon radical, and only two silicon-bonded perfluoroalkoxy radicals, the resulting completely condensed product consists essentially of difunctional siloxane units containing both a silicon-bonded monovalent hydrocarbon radical and a silicon-bonded carbperfluoroalkoxyalkyl radical.

The hydrolysis and condensation of a silane within the scope of Formula 1, results in an organopolysiloxane containing an average of one carbperfluoroalkoxyalkyl radical per silicon atom. Because it is often desirable to have fewer than one of these radicals per silicon atom for many applications, the silane within the scope of Formula 1 can be cohydrolyzed and condensed with a silane within the scope of the following formula:

(8) 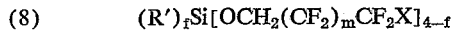

where R' and m and X are as previously defined, and f is an integer equal to from 1 to 3 inclusive. Silanes within the scope of Formula 8 are easily prepared by effecting reaction between the corresponding chlorosilane and the corresponding perfluoroalkyl alcohol by means well known in the art. Thus, the reaction to form the silane within the scope of Formula 8 can be prepared by merely heating a mixture of the corresponding chlorosilane and a perfluoro alcohol within the scope of Formula 3. The desired product is separated from the reaction mixture by fractional distillation, by means well known to the art. The silane within the scope of Formula 1 is reacted with one or more silanes within the scope of Formula 8 to produce the organopolysiloxane within the scope of Formula 2. The reaction conditions employed for this cohydrolysis and co-condensation are identical to those employed in the hydrolysis of the silanes within the scope of Formula 1 by itself. Again, the degree of condensation of the resulting product will depend on the particular reactants employed and the reaction conditions employed, so that it is possible to obtain organopolysiloxanes containing both siloxane units and silicon-bonded perfluoroalkoxy radicals, and silanes containing siloxane units only between silicon atoms. These copolymers within the scope of Formula 2 can vary from chain-stopped silicone fluids to trifunctional siloxanes, depending on the starting materials employed. Another method for forming the organopolysiloxanes of Formula 2 is by first forming a copolymer of the chlorocarbalkylchlorosilane within the scope of Formula 5 and chlorosilanes within the scope of the following formula:

(9) 

where R' and f are as previously defined. This cohydrolysis and co-condensation product, which contains the silicon-bonded chlorocarbalkyl radicals is then reacted with a perfluoro alcohol of Formula 3 to replace the acyl chloride chlorine atom with the perfluoroalkoxy radicals. This reaction is effected in the same way in which the reaction between the chlorocarbalkylchlorosilane of Formula 5 and the perfluoro alcohol of Formula 3 is effected. That is, the organopolysiloxane containing the siliconbonded chlorocarbalkyl radical and the perfluoro alcohol are merely heated together for a sufficient time to effect reaction. The copolymer of the silane within the scope of Formula 5 and the silane within the scope of Formula 9 is prepared by merely adding the various reactants to water to cause hydrolysis of the silicon-bonded chlorine atoms to form silanol groups which condense to form siloxane linkages in a manner well known in the art. The nature of the siloxane containing the silicon-bonded chlorocarbalkyl radicals attached to silicon is of course dependent on the nature of the particular starting materials, and may vary from trimethylsilyl chain-stopped fluids to highly resinous materials containing only a single monovalent hydrocarbon radical or carbperfluoroalkoxyalkyl radical attached to each silicon atom.

A still further method of preparing the siloxanes of Formula 2 is by effecting reaction between an organopolysiloxane containing silicon-bonded carbalkyl radicals and a perfluoro alcohol within the scope of Formula 3. Among the various organopolysiloxanes containing silicon-bonded carbalkyl radicals are those disclosed in the copending application of Glen D. Cooper and Maurice Prober, Serial No. 529,896, filed August 22, 1955, and assigned to the same assignee as the present invention which application is incorporated by reference into the present application. One class of organopolysiloxanes containing silicon-bonded carbalkyl radicals has the formula:

(10) 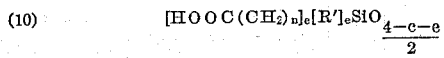

where $R'$, $c$, $e$ and $n$ are as previously defined and the sum of $c$ plus $e$ is from 1.0 to 2.67. One method for accomplishing the synthesis of the siloxanes of Formula 10 is by hydrolyzing a chlorocarbalkylchlorosilane of Formula 5 alone or together with one or more additional chlorosilanes within the scope of Formula 9 in an aqueous alkaline medium, which results in the hydrolysis of the silicon-bonded chlorine atoms and the condensation of the resulting silanol groups to siloxane linkage, with the simultaneous conversion of the acid chloride chlorine atom to the corresponding alkaline salt. The alkaline salt of the carboxyalkyl group is then converted to the acid by neutralization of the reaction mixture with a suitable acid. Among the alkaline condensing agents which may be employed in the preparation of the carbalkyl organopolysiloxane of Formula 10 is aqueous sodium hydroxide with the subsequent neutralization of the alkaline condensation product with sulfuric acid. In addition to carrying out the aforementioned hydrolysis of the chlorocarboxyalkylsilane of Formula 5 with one or more chlorosilanes of Formula 9 in an alkaline medium, the hydrolysis can also be accomplished by merely mixing the various silanes with water. Hydrogen chloride which is liberated by the hydrolysis of silicon-bonded chlorine atoms acts as a further hydrolysis and condensation catalyst and, at the same time, converts the acyl chloride chlorine to a hydroxy group. The organopolysiloxane which is formed during this aqueous hydrolysis reaction forms a separate layer from the aqueous layer. The organopolysiloxane is recovered by decantation and can be neutralized, if necessary, to yield the carbalkylsiloxane of Formula 10.

The carbalkylpolysiloxane of Formula 10 is reacted with the perfluoro alcohol of Formula 3 to produce the carbperfluoroalkoxyalkylsilane of Formula 2. This reaction is preferably conducted by heating the two reactants at a temperature of from about 50 to 150° C., employing one mol of the perfluoro alcohol of Formula 2 for each mol of silicon-bonded carbalkyl radicals in the organopolysiloxane of Formula 10. The time required for effecting reaction between the siloxane of Formula 10 and the perfluoro alcohol of Formula 3 may vary within wide limits, depending upon the degree of condensation of the organopolysiloxane and the particular alcohol employed. In addition, the rate of reaction depends on whether a suitable catalyst is employed. Preferably the reaction is conducted in the presence of a conventional esterification catalyst such as tetrabutyltitanate, since the reaction is speeded up thereby. Where an esterification catalyst is employed, it is generally employed in an amount equal to from about 1 to 10% by weight, based on the weight of the organopolysiloxane of Formula 10. Isolation of the siloxane of Formula 2 from the reactants can be accomplished by a number of different methods, depending upon the nature of the final product. Where the final organopolysiloxane of Formula 2 is a liquid, the organopolysiloxane is separated preferably by fractional distillation. Where the organopolysiloxane of Formula 2 is a solid, it is preferably washed with an alkaline solution, such as an alkaline sodium hydroxide solution which forms the sodium salts of both the unreacted alcohol of Formula 3 and the unreacted carboxyalkylsiloxane of Formula 10, both of which are soluble in the alkaline solution. This results in an aqueous phase and an organopolysiloxane phase which consists essentially of the siloxane of Formula 2 which is separated from the aqueous phase by mechanical means.

A still further method of preparing the carbperfluoroalkoxyalkylsiloxanes of Formula 2 is by effecting reaction between a perfluoro alcohol of Formula 3 and a carbalkoxyalkylsilane having the formula:

(11) 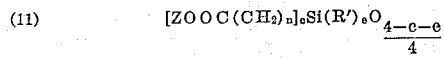

where Z is a lower alkyl radical, e.g., an alkyl radical having from 1 to 6 carbon atoms, $c$, $e$, $n$ and $R'$ are as previously defined and the sum of $c$ plus $e$ is from 1.0 to 2.67. The preparation of carbalkoxyalkylorganopolysiloxane is described in the application of Ben A. Bluestein, Serial No. 647,220, filed March 20, 1957, and assigned to the same assignee as the present invention. This Bluestein application is hereby incorporated by reference into the present application. The process of the Bluestein application comprises the reaction of a cyanoalkylsilane of Formula 4 with a lower alkanol, e.g., an alkanol containing from 1 to 6 carbon atoms, to convert the nitrile group to a carbalkoxy radical, while at the same time converting the silicon-bonded chlorine atoms to the corresponding alkoxy radicals. The resulting material is subsequently hydrolyzed with water to produce the carbalkoxyalkylsilane of Formula 11. In carrying out the process of the aforementioned Bluestein application, a sufficient number of mols of the lower alkanol are employed so as to provide one mol of alkanol for each mol of silicon-bonded cyanoalkyl radicals and one mol of alkanol for each mol of silicon-bonded chlorine atoms. Where the cyanoalkylsilane of Formula 4 is co-reacted with other chlorosilanes, such as those having the Formula 9, a sufficient number of mols of the lower alkanol are employed so that one mol of the alkanol is present for each mol of silicon-bonded chlorine in the mixture. Preferably the reaction mixture is heated at a temperature of about 50° C. for times ranging from a few minutes to several hours or more to produce the corresponding alkoxy composition. Thereafter, sufficient water is employed to effect conversion of the alkoxy groups to polysiloxane linkages. Generally, at least one mol of water per silicon-bonded chlorine atom in the starting cyanoalkylchlorosilane mixture is employed. This hydrolysis reaction is generally carried out at a temperature of from about 25 to 60° C. for a time ranging from a few minutes up to several hours, depending upon the particular reactants involved.

The carbperfluoroalkoxyalkylsiloxanes of Formula 2 are formed from the carbalkoxyalkylsiloxanes of Formula 11 by reacting the latter with a perfluoro alcohol of Formula 3. Generally, one mol of the perfluoroalkyl alcohol of Formula 3 is employed for each mol of silicon-bonded carbalkoxyalkyl radicals in the siloxane of Formula 11. Reaction is effected by heating the reactants, preferably in the presence of a suitable trans-esterification catalyst, for a time ranging from a few hours up to 24 hours or more. Any of the conventional trans-esterification catalysts may be employed in the reaction described. Preferably the catalyst is of the same type as that used in the alcoholysis reaction described previously, and is an orthotitanate such as tetrabutyltitanate. Another suitable trans-esterification catalyst is the sulfonated coal catalyst, sold under the trade name Zeokarb-H catalyst. The trans-esterification reaction is effected by heating the reactants at a temperature of from about 50° C. to the reflux temperature of the reaction mixture. During the reaction, the perfluoroalcohol of Formula 3 replaces the lower alkanol radical of the carbalkoxyalkylsiloxane and the lower alkanol distills from the reaction mixture.

In effecting reaction between the perfluoro alcohol of Formula 3 and the carbalkoxyalkylsiloxane of Formula 11, a sufficient amount of the perfluoro alcohol is employed to provide one mol of the alcohol per mol of silicon-bonded carbalkoxyalkylsiloxane units. While excesses of either reactant, such as a tenfold excess, can be employed, no particular advantage is derived therefrom and it is preferred that stoichiometric amounts of the two reactants be employed. The amount of trans-esterification catalyst can also vary within wide limits, with from 1 to 10% by weight of the catalyst based on the weight of the siloxane of Formula 11 preferably being employed. After formation of the carbperfluoroalkoxysiloxane of Formula 2, the product can be isolated from the reaction mixture in the same method as described in connection with the same siloxane prepared by the reaction of the perfluoro alcohol with the carboxyalkylsiloxane of Formula 10.

In order that those skilled in the art may better understand how the present invention can be practiced, the following examples are given by way of illustration and not by way of limitation.

EXAMPLE 1

To a reaction vessel equipped with a stirrer and a reflux condenser were added 260 parts by weight of 1,1,7-trihydroperfluoroheptanol and 40 parts by weight of cyanoethyltrichlorosilane. The mixture was stirred for 24 hours at 100° C. and at this time an excess of water was added. The water solution was decanted and the remaining heavy liquid was washed until neutral. This liquid was fractionally distilled to produce the silane having the following formula:

(12) 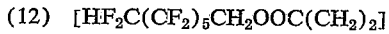 

$[HF_2C(CF_2)_5CH_2OOC(CH_2)_2]Si[OCH_2(CF_2)_5CF_2H]_3$

The identity of this material was confirmed by infrared analysis.

EXAMPLE 2

By the procedure of the aforementioned Bluestein application, Serial No. 647,220, an organopolysiloxane fluid composed of about 20 mol percent carbmethoxyethylsiloxane units, 21 mol percent of trimethylsiloxane units, and 59 mol percent dimethylsiloxane units was formed by adding a mixture of 49 parts by weight of cyanoethyltrichlorosilane, 96 parts by weight of dimethyldichlorosilane and 30 parts by weight of trimethylchlorosilane to 300 parts by weight of methanol. After heating this mixture for 2½ hours at its reflux temperature, 800 parts by weight of water was added. This resulted in the precipitation of an oil which was washed four times with water to yield the desired product. To 159 parts of this oil was added 104 parts of 1,1,11-trihydroperfluoroundecanol and 10 parts by weight of tetrabutyl titanate. This mixture was heated at a temperature of 150° C. for 96 hours, during which time the perfluoroalkoxy groups replaced the methoxy groups, resulting in a silicone fluid having a viscosity of 289 centistokes at 25° C. and a refractive index $N_D^{25}$ 1.4021 which consisted essentially of trimethylsiloxane units, dimethylsiloxane units, and siloxane units having the following average structure:

(13)    $HF_2C(CF_2)_9CH_2OOC(CH_2)_2SiO_{3/2}$

The identity of this material was confirmed by infrared analysis.

EXAMPLE 3

Following the procedure of Example 2, an organopolysiloxane fluid was prepared which contained about 16.5 mol percent of carbmethoxyethylsiloxane units, 50 mol percent trimethylsiloxane units and 33.5 mol percent dimethylsiloxane units. To 160 parts of this fluid were added 104 parts by weight of 1,1,5-trihydroperfluoropentanol and 10 parts by weight of tetrabutyltitanate. This mixture was heated at 150° C. for 50 hours, during which time the perfluoroalkoxy radicals replaced the methoxy radicals. The resulting fluid was washed with water, filtered, and stripped to a pot temperature of 170° C. and a head temperature of 110° C. at 10 mm. pressure. This resulted in an organopolysiloxane fluid having a viscosity of 30 centistokes at 25° C. and a refractive index $N_D^{25}$ 1.4086, which consisted essentially of trimethylsiloxane units, dimethylsiloxane units, methylsiloxane units, and siloxane units having the formula:

(14)    $HF_2C(CF_2)_3CH_2OOC(CH_2)_2SiO_{3/2}$

The identity of this fluid was confirmed by infrared analysis.

EXAMPLE 4

Following the procedure of Example 2, a carbmethoxyethylsiloxane fluid was prepared containing 16.5 mol percent carbmethoxyethylsiloxane units, 50 mol percent trimethylsiloxane units, and 33.5 mol percent dimethylsiloxane units. To 60 parts by weight of this fluid was added 104 parts of 1,1,5-trihydroperfluoropentanol, and 10 parts by weight of a sulfonated coal catalyst sold under the name Zeokarb H catalyst. This mixture was heated to a pot temperature of 110° C. for 24 hours, during which time the perfluoroalkoxy group replaced the methoxy group. After stripping this reaction mixture to a pot temperature of 150° C. and a head temperature of 85° C. at 8 mm., there was obtained a clear white silicone fluid having a viscosity of 3133 centistokes at 25° C. and a refractive index $N_D^{25}$ 1.4063, which fluid consisted essentially of trimethylsiloxane units, dimethylsiloxane units, and siloxane units of Formula 14. The identity of this material was confirmed by infrared analysis.

EXAMPLE 5

To 75 parts by weight of the carbmethoxyalkylsiloxane fluid of Example 2 was added 57 parts by weight of 1,1-dihydroperfluorooctanol and 2 parts by weight of the Zeokarb H catalyst. After stirring the reaction mixture at 150° C. for 30 hours, the fluid was stripped to give a residual fluid having a viscosity of 68 centistokes at 25° C. and a refractive index $N_D^{25}$ 1.4143, and which consisted essentially of dimethylsiloxane units, trimethylsiloxane units, and siloxane units having the following formula:

(15)    $F_3C(CF_2)_6CH_2OOC(CH_2)_2SiO_{3/2}$

The identity of this material was confirmed by infrared analysis.

In order to evaluate the effectiveness of the carbperfluoroalkoxyalkylsiloxane fluids prepared in Examples 2 through 5, samples of these fluids as well as samples of the carbmethoxyalkylsiloxane fluids employed as starting materials were dissolved in xylene mixed with a curing catalyst, padded onto cotton cloth and cured. Thereafter, each sample of treated cloth was subjected to spray rating tests similar to those described in the 1945 yearbook of the American Association of Textile Chemists and Colorists, vol. XX, pages 229–233. Specifically, two parts of each the silicone fluid were added to 100 parts by weight of xylene, and 0.1 part of a 28 percent tin octoate solution in xylene was added to the mixture. Each xylene solution was padded on a square of 80 x 80 cotton print cloth by running the cloth sample through a padder or quetch adjusted to a pressure of about 45 to 60 lb. in order to remove excess treating solution. The cloth was then cured for 6 minutes at 150° C. In Table I below are listed the initial spray ratings of cloths treated with the starting carbmethoxyethylsiloxanes of Examples 2 through 5, as well as cloths treated with the carbperfluoroalkoxyethylsiloxane of Examples 2 through 5. As is apparent from the data shown in Table 1, the initial spray rating of the cotton cloth treated with the carbperfluoroalkoxyethylsiloxane was much higher on the initial spray rating than the carbmethoxyethyl fluid.

*Table 1*

| Fluid of Example | Carbmethoxy fluid | Carbperfluoroalkoxy fluid |
|---|---|---|
| 2 | 0 | 80 |
| 3 | 0 | 50 |
| 4 | 0 | 50 |
| 5 | 0 | 90 |

EXAMPLE 6

To a reaction vessel equipped with a stirrer, dropping funnel and thermometer was added 87 parts by weight of acrylyl chloride, 0.5 part of chloroplatinic acid, and the mixture was heated to its reflux temperature. While under reflux, 34 parts by weight of trichlorosilane in which was mixed 10 parts by weight of tri-n-butylamine was added to the reaction mixture, during which time the pot temperature rose from 74° C. to 90° C. After refluxing the mixture for two hours, the mixture was fractionally distilled to separate pure chlorocarbethyltrichlorosilane, whose identity was confirmed by infrared analysis.

EXAMPLE 7

To a reaction vessel was added 135 parts by weight of the chlorocarbethyltrichlorosilane prepared in Example 6, and 0.5 part by weight of barium chloride. To this mixture was added 96 parts by weight of 1,1-dihydroperfluorooctanol, while the mixture was heated at a temperature which varied from 80 to 130° C. for 24 hours. At the end of this time, the reaction mixture was cooled and suspended solids were filtered through diatomaceous earth and the filtrate was stripped to a pot temperature of 120° C. and a pressure of 5 mm. This resulted in 86 parts of a silane having the formula

(16) $F_3C(CF_2)_6CH_2OOC(CH_2)_2Si[OCH_2(CF_2)_6CF_3]_3$ which had a refractive index $N_D^{25}$ 1.3280 and whose identity was confirmed by infrared analysis.

EXAMPLE 8

Using the procedure described in Example 7, 18 parts by weight of chlorocarbethyltrichlorosilane were heated for 20 hours and refluxed with 170 parts by weight of 1,1,11-trihydroperfluoroundecanol. The reaction mixture was then stripped to a pot temperature of 135° C. at 5 mm. to produce a silane having a melting point of 72–74° C., whose infrared curve confirmed its identity as a silane having the following formula

(17) $HF_2C(CF_2)_9CH_2OOC(CH_2)_2$
$Si[OCH_2(CF_2)_9CF_2H]_3$

EXAMPLE 9

Following the procedure of Example 7, 10 parts by weight of 1,1-dihydroperfluorobutanol were heated for 20 hours with 2.68 parts by weight of chlorocarbethyltrichlorosilane at 70 to 80° C. At the end of this time, the reaction mixture was heated and vacuum distilled to remove excess alcohol, resulting in a liquid material having a refractive index $N_D^{25}$ 1.3283 and having the formula below, which formula was confirmed by infrared analysis

(18) $F_3C(CF_2)_2CH_2OOC(CH_2)_2Si[OCH_2(CF_2)_2CF_3]_3$

The carbperfluoroalkoxyalkylsilanes prepared in Examples 7 through 9 were applied to cotton fabric by dissolving one part of the silane in 100 parts of acetone. This solution was then padded onto a fabric and the acetone removed with heat. Each of the fabrics was then padded in an aqueous bath containing 1% of amine hydrochloride. The fabrics were then heated at a temperature of 150° C. for 6 minutes to remove the water and to cure the carbperfluoroalkoxyalkylsilanes. Each of these fabrics was then tested to determine its initial spray rating and to test its oil repellency characteristics. The initial spray ratings of the fabrics treated with the silanes of Examples 7, 8 and 9 were respectively 80, 70 and 80. When a drop of mineral oil was placed on the fabrics treated with the silanes of Examples 7 and 9, the drop retained its shape and did not wet the fabric. This is in contrast to the deleterious effect of oil, such as mineral oil, on conventional silicone-treated fabrics. For example, when a fabric which is coated with a siloxane consisting essentially of methylsiloxane units is subjected to this same oil resistance test, the drop of oil rapidly wets the surface of the coated fabric.

EXAMPLE 10

One part of the silane of Example 9 which had Formula 18 is added to 100 parts by weight of a 6% aqueous hydrochloric acid solution and the mixture is stirred at room temperature for 30 minutes. During this time, the silane of Formula 18 is partially hydrolyzed and condensed to provide a two-layer system. The aqueous layer is decanted and the remaining oil layer washed twice with water to produce a mixture of organopolysiloxanes of varying degrees of hydrolysis and condensation having the average formula:

(19) $[F_3C(CF_2)_2CH_2OOC(CH_2)_2]$
$[F_3C(CF_2)_2CH_2O]SiO$

Two parts of this fluid are dissolved in 100 parts of benzene and the resulting solution is padded onto an 80 x 80 rayon print fabric. The coated fabric is heated at a temperature of 100° C. to remove the benzene. The cloth is then added to an aqueous solution of 2% amine hydrochloride and the excess solution allowed to drain from the cloth which is then heated at 150° C. for 6 minutes. This cloth has an initial spray rating in excess of 80 and drops of mineral oil applied to the surface of the cloth retained their original shape, indicating that the cloth is oil-repellent.

While the organopolysiloxane containing silicon-bonded carbperfluoroalkoxyalkyl radicals of the present invention are all useful in applications wherein water-repellency of products treated with these organopolysiloxanes is required, it is found that oil resistance is found only with those organopolysiloxanes in which the carbperfluoroalkoxy radical is an ester of a 1,1-dihydroperfluoro alcohol. Apparently the presence of the single hydrogen atom on the omega carbon atom of the alpha, alpha, omega-trihydroperfluoroalkoxy radical renders the resulting carbperfluoroalkoxyalkylorganopolysiloxane less oil resistant than when the omega carbon atom contains three fluorine atoms.

EXAMPLE 11

Gamma-chlorocarbpropylmethyldichlorosilane was prepared by reacting 34 parts by weight of vinylacetyl chloride with 49 parts by weight of methyldichlorosilane in the presence of 1 part by weight of platinum on carbon catalyst containing 2% platinum, and 0.1 part of chloroplatinic acid. Reaction was effected by heating the reaction mixture at reflux for about 4 hours, during which time the reflux temperature rose to about 75° C. The reaction mixture was then fractionally distilled under vacuum to produce the desired product which boiled at 102–104° C. at 15 mm. The identity of the product was confirmed by infrared analysis and chlorine analysis, which showed the presence of 48.55% chlorine as compared with the theoretical value of 48.46%.

EXAMPLE 12

A gamma-chlorocarbpropylmethylsiloxane was prepared by adding 17 parts by weight of the gamma-chlorocarbpropylmethyldichlorosilane of Example 11 to 25 parts of benzene and 1 part of water. This mixture was heated at 45° C. for one hour, during which time hydrolysis of the silicon-bonded chlorine atoms and condensation of the silanol groups occurred with practically no reaction at the chlorocarboxy group. To this organopolysiloxane was added 30 parts of 1,1-dihydroperfluorooctanol and 0.8 part of water. The mixture was heated at 80° C. for four hours, resulting in an organopolysiloxane fluid consisting essentially of recurring difunctional siloxane units having the formula below, whose identity was confirmed by infrared analysis:

(20)     $[F_3C(CF_2)_6CH_2OOC(CH_2)_3][CH_3]SiO$

EXAMPLE 13

To a reaction vessel was added 56 parts by weight of 1,1-dihydroperfluorooctanol and 11.5 parts of gamma-chlorocarbpropylmethyldichlorosilane, and the resulting mixture was refluxed for five hours at 80° C. and three hours at 90° C. and 17 hours at 60° C. under varying pressures. The resulting product was stripped at a temperature of 125° C. at 4 mm. pressure, leaving a residue having a refractive index $N_D^{25}$ 1.3483 whose structure was determined by infrared analysis to be:

(21)     $[F_3C(CF_2)_6CH_2OOC(CH_2)_3]$
$[CH_3]Si[OCH_2(CF_2)_6CF_3]_2$

EXAMPLE 14

An organopolysiloxane convertible to the solid elastic cured state is prepared by mixing together 20 mol percent of the silane of Formula 21 with 80 mol percent of the silane of Formula 22 below:

(22)     $(CH_3)_2Si[OCH_2(CF_2)_6CF_3]_2$ which is prepared by heating one mol of dimethyldichlorosilane with 2 mols of 1,1-dihydroperfluorooctanol at reflux temperature until all of the hydrogen chloride is removed. Ten parts by weight of a mixture of silanes of Formula 21 and Formula 22 are added to 100 parts by weight of 6% aqueous sulfuric acid and the reaction mixture is stirred at room temperature for 6 hours, resulting in an aqueous sulfuric acid layer and a polysiloxane fluid consisting essentially of 20 mol percent of the intercondensed siloxane units of Formula 20 and 80 mol percent of dimethylsiloxane units, and having a viscosity in excess of 100,000 centipoises. This viscous material is convertible to the elastic state by the same method as conventional organopolysiloxanes. Thus, 100 parts by weight of this viscous fluid is mixed with 40 parts by weight of silica aerogel and 3 parts by weight of benzoyl peroxide, and heated at a temperature of 125° C. for 30 minutes, and then post-cured at 150° C. for 4 hours. At the end of this time, a silicone rubber is formed which is characterized by the usual properties of silicone rubbers with regard to high temperature resistance, and which is further characterized by solvent resistance. Thus, when a conventional polydimethylsiloxane rubber is immersed in toluene for 24 hours, it is found that the material swells about 100% of its original volume. In contrast to this, the swell of the carbperfluoroalkoxyalkyl containing organopolysiloxane is less than 50% under similar conditions.

One of the particular advantages of the carbperfluoroalkoxyalkylorganopolysiloxanes of the present invention is that they may be employed as foam inhibitors in applications where conventional organopolysiloxanes are not satisfactory. For example, one very useful class of organopolysiloxane lubricant is the organopolysiloxanes disclosed in Burkhard Patent 2,689,859, which comprise trimethylsilyl chain-stopped methylchlorophenylsiloxanes, and trimethylsilyl chain-stopped copolymers of dimethylsiloxane units, and methylchlorophenylsiloxane units, wherein the silicon-bonded phenyl radicals can contain an average of from 1 to 2 chlorine constituents. While these materials, which will be referred to hereinafter as chlorophenylsilicone fluids, are particularly useful in applications requiring extreme pressure lubricating characteristics, it is sometimes found that the environment in which these chlorophenyl silicone lubricants are employed cause foaming, which foaming tends to decrease the effectiveness of the lubricating system. When an attempt is made to reduce the foaming characteristics of these chlorophenyl silicone fluids by incorporation of conventional methyl silicon fluids therein, such as the fluids disclosed in Patnode Patent 2,469,890, it is found that foaming still takes place, regardless of the concentration of the methylpolysiloxane fluid in the chlorophenyl silicone fluid. In contrast to this, when minor amounts such as from 0.5 to 5% by weight of the carbperfluoroalkoxyalkyl organopolysiloxanes of the present invention are incorporated in these chlorophenyl silicone fluids, it is found that foaming is substantially eliminated. In particular, when a tetrachlorophenylmethylsiloxane containing an average of ten silicone atoms in the chain is shaken in air, it is found that the foam produced will persist for approximately 10 minutes. When 2% by weight of the trimethylsilyl chain-stopped dimethylsiloxane fluids of the aforementioned Patnode patent is incorporated into this chlorophenyl silicone fluid, it is found that the foam still persists for about 10 minutes. In contrast to this, when 0.1% by weight of the carbperfluoroalkylsiloxane fluid of Example 8 or of Example 9 was added to the chlorophenylsiloxane, foam could not be produced by violent agitation.

The carbperfluoroalkoxyalkylsiloxanes of the present invention are also useful per se as lubricants and have better lubricating properties than either the conventional trimethylsilyl chain-stopped dimethylpolysiloxanes or the chlorophenylsiloxanes of the aforementioned Burkhard patent. In particular, the carbperfluoroalkylorganopolysiloxane fluid of Example 7 was tested in a Shell 4-ball wear tester (described in the magazine "Engineering" of July 14, 1933, vol. 136; see also U.S. Patent 2,466,642), using various loads and different surfaces between which the particular organopolysiloxane was employed as a lubricant. As a control, a liquid linear methylpolysiloxane oil prepared in the manner described in the aforementioned Patnode patent was used as a control, and a tetrachlorophenylmethylsiloxane fluid having a viscosity of about 50 centipoises prepared by the method of the aforementioned Burkhard patent was also employed as a control. Each of the oils was placed in a Shell 4-ball wear tester and subjected to its action at 500° F. under a 40 kg. load for one hour at 600 r.p.m. The following table discloses the results of these wear tests, wherein the size of the wear scar is given in mm. The lower the wear scar, the higher the lubricating efficiency of the particular fluid.

*Table II*

| Fuid: | Wear scar |
|---|---|
| Methyl silicone | Very poor. |
| Chlorophenyl silicone | 1.4. |
| Carbperfluoroalkoxyalkyl silicone | 0.935. |

While the foregoing examples have of necessity been limited to only a few of the very many carbperfluoroalkoxyalkylsilanes and siloxane homopolymers and copolymers within the scope of the present invention, it should be understood by those skilled in the art that other materials than those specifically described can be readily prepared following the general procedure outlined in the examples and in the description of the present invention.

While several uses of the materials within the present invention have been disclosed, it should be understood that these materials have the same utility as those of conventional organopolysiloxane fluids, resins and elastomers, plus the special uses made possible by the silicon-bonded carbperfluoroalkoxyalkyl radicals. Thus, the organopolysiloxane resins of the present invention can be employed in casting and molding operations where rigid resinous materials are required. For example, these resins can be employed in the encapsulation of electrical apparatus, such as transformers and the like. The fluids within the scope of the present invention may be employed as transmission fluids, hydraulic fluids, lubricants, lubricity additives, and dielectric materials. The elastomers and materials convertible to the elastomeric form within the scope of the present invention can be employed in dielectric applications as coatings for electrical conductors, as cushioning agents, as flexible tubing, as gaskets and O-ring materials and the like.

What I claim as new and desire to secure by Letters Patent of the United States is:

1. An organosilane having the formula $$[XF_2C(CF_2)_mCH_2OOC(CH_2)_n][R]_aSi[OCH_2(CF_2)_mCF_2X]_b$$

where R is a monovalent hydrocarbon radical free of aliphatic unsaturation, X is a member selected from the class consisting of hydrogen and fluorine, $a$ is a whole number equal to from 0 to 1, inclusive, $b$ is an integer equal to from 2 to 3, inclusive, $m$ is an integer equal to at least 2, $n$ is an integer equal to at least 2, and the sum of $a$ plus $b$ is 3.

2. An organosilane having the formula $$[HF_2C(CF_2)_5CH_2OOC(CH_2)_2]Si[OCH_2(CF_2)_5CF_2H]_3$$

3. An organosilane having the formula $$[F_3C(CF_2)_6CH_2OOC(CH_2)_2]Si[OCH_2(CF_2)_6CF_3]_3$$

4. An organosilane having the formula $$[HF_2C(CF_2)_9CH_2OOC(CH_2)_2]Si[OCH_2(CF_2)_9CF_2H]_3$$

5. An organosilane having the formula $$[F_3C(CF_2)_2CH_2OOC(CH_2)_2]Si[OCH_2(CF_2)_2CF_3]_3$$

6. An organosilane having the formula $$[F_3C(CF_2)_6CH_2OOC(CH_2)_3][CH_3]Si[OCH_2(CF_2)_6CF_3]_2$$

7. An organopolysiloxane having the formula $$[XF_2C(CF_2)_mCH_2OOC(CH_2)_n]_c[XF_2C(CF_2)_mCH_2O]_d[R']_eSiO_{\frac{4-c-d-e}{2}}$$

where R' is a monovalent hydrocarbon radical, X is a member selected from the class consisting of hydrogen and fluorine, $c$ has a value of from 0.05 to 1.0, $d$ is not more than $c$ and is equal to from 0 to 1.0, $e$ has a value of 0 to 2.33, $m$ is an integer equal to at least 2, $n$ is an integer equal to at least 2, and the sum of $c$ plus $d$ plus $e$ is from 1.0 to 2.67.

8. An organopolysiloxane fluid composed of trimethylsiloxane units, dimethylsiloxane units, and units having the formula $$HF_2C(CH_2)_9CH_2OOC(CH_2)_2SiO_{3/2}$$

9. An organopolysiloxane composed of trimethylsiloxane units, dimethylsiloxane units, monomethylsiloxane unit, and siloxane units having the formula $$HF_2C(CF_2)_3CH_2OOC(CH_2)_2SiO_{3/2}$$

10. An organopolysiloxane composed of trimethylsiloxane units, dimethylsiloxane units, and siloxane units having the formula $$HF_2C(CF_2)_3CH_2OOC(CH_2)_2SiO_{3/2}$$

11. An organopolysiloxane composed of trimethylsiloxane units, dimethylsiloxane units, and siloxane units having the formula $$F_3C(CF_2)_6CH_2OOC(CH_2)_2SiO_{3/2}$$

References Cited in the file of this patent

UNITED STATES PATENTS

| | | |
|---|---|---|
| 2,723,987 | Speier | Nov. 15, 1955 |
| 2,777,870 | McBee et al. | Jan. 15, 1957 |
| 2,892,859 | McBee et al. | June 30, 1959 |
| 2,921,957 | O'Rear et al. | Jan. 16, 1960 |
| 2,966,508 | Kerschner et al. | Dec. 27, 1960 |
| 2,970,150 | Bailey | Jan. 31, 1961 |

OTHER REFERENCES

Stump: WADC Technical Report 56–520, "Copolymers of 1,1-Dihydroperfluorobutyl Acrylate With Some Vinyl Silane," August 1957, 12 p., 6 p. graphs.